April 28, 1964 D. A. JELLIES 3,130,737
AUTOMATIC DISHWASHING APPLIANCE
Filed Oct. 9, 1962

INVENTOR.
DAVID A. JELLIES
BY
ATTY.

United States Patent Office 3,130,737
Patented Apr. 28, 1964

3,130,737
AUTOMATIC DISHWASHING APPLIANCE
David A. Jellies, Fullerton, Calif., assignor to General
Electric Company, a corporation of New York
Filed Oct. 9, 1962, Ser. No. 229,299
4 Claims. (Cl. 134—57)

The present invention relates to automatic dishwashing appliances and more particularly to improved drive mechanisms for such appliances.

It is therefore an object of the invention to provide an improved drive motor mechanism for use in powering a domestic dishwasher.

It is a further object of the invention to utilize a resistance start induction motor as the drive motor of the dishwashing machine and to use the resistance element of the start circuit as a heat source for the dish drying cycle.

It is a still further object of the invention to utilize as the drive motor of a dishwasher, a resistance start induction motor, in which the resistor used is a resistance heater which remains energized during the entire drive motor operation. During the washing and rinsing cycles, the water in the tub is heated and heat is accumulated in a drying air duct. During the drying cycle, a high volume air stream is passed over the heat accumulator. By preheating the accumulator prior to the start of the drying cycle, a substantially lessened wattage output is required during drying to maintain the temperature of the passing air stream at a suitable elevated level.

To effectuate these and other objects, the present invention contemplates, in one form, the use of a reversible, single-phase, induction motor to power the appliance.

The main winding of the motor is constructed with reasonably low resistance and substantial inductance. The auxiliary winding has few turns, low inductance and low resistance. The motor windings are energized mutually out of phase for starting as is well-known in the art. It is also known that with this form of construction, characteristically the motor produces low starting torque; this characteristic is nevertheless acceptable in dishwashing machines where only water or air is to be circulated by the motor action.

To produce the out-of-phase current necessary for starting and to protect the auxiliary winding, the motor utilizes a current limiting resistor in series with the start or auxiliary winding. The resistor and start winding are both retained in the circuit at all times when the drive motor is operating. The current limiting resistor, which as mentioned, is in series with the motor start winding, may preferably be an open coil heating unit. The heating unit is positioned in an air duct. Air is heated in the duct and the heated air is passed to the interior of the dishwashing compartment to dry the wet dishes contained in the compartment.

During the washing cycle with wash water in the compartment, the motor is rotated in a first direction. Rotation in this first direction circulates water throughout the wash compartment. A fan or blower wheel carried on the lower end of the motor shaft is also rotated in a first direction to pump a low volume air stream to the wash compartment. The resistance heater at this time is primarily heating the air passage duct and secondarily the low volume air currents. By providing this low volume air flow to the compartment while hot water is being circulated, the quantity of steamy vapors passed to and through the exhaust air vent of the dishwasher compartment is maintained at a minimum.

At the end of the wash cycle, a pump is energized to remove the free water from the compartment. Following the removal of the free water, the drive motor is energized in the reverse direction to circulate a high volume air flow through the preheated duct for passage to the compartment for drying the dishes. The water-circulating impeller, also being rotated during this motor operation, circulates air more completely through the dish-bearing compartment. At the conclusion of a time period calculated to dry the dishes, the motor is deenergized, as is the heater.

By using this system, there is eliminated the need for a start relay or centrifugal switch, a starting capacitor or other phase shifting device, and also the necessity of providing a separate heating unit for air or liquid heating. In addition, the air duct is heated during washing and rinsing as the motor is operated, thereby lessening the power necessary to heat the drying air during the dry cycle. Optimally, a heat storing medium may be installed in proximity to the heater to store the heat generated during the wash period for use during the drying cycle.

Other objects, features and advantages of the invention will become apparent from the following specification read in connection with the accompanying drawings in which.

Figure 1:
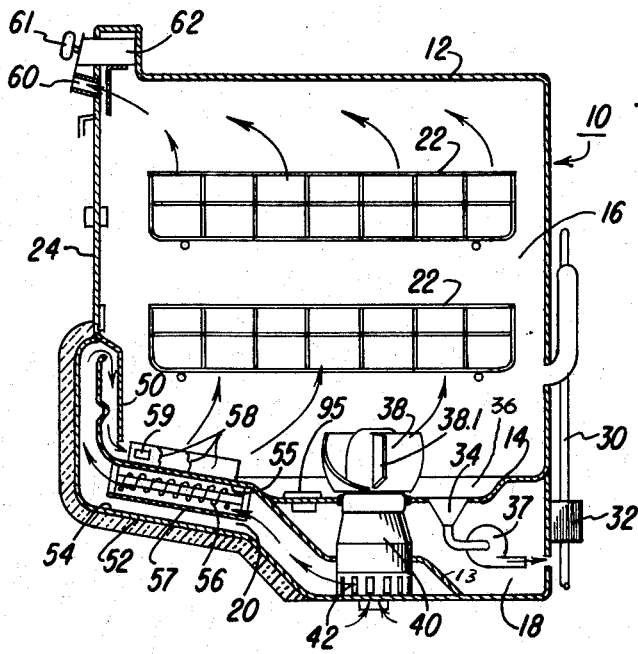
FIG. 1 is a side sectional elevation of a dishwasher utilizing my invention.

In FIG. 1 there is shown a dishwasher 10 which comprises a cabinet 12 of generally cubical shape. By any suitable means (not shown) the cabinet is arranged to be supported within a counter-top cabinet (not shown) above the floor thereof. A horizontal wall 14 forms the bottom surface of a dishwashing and drying compartment 16. The lower portion of the cabinet interior below wall 14 is divided by wall 13 into a drive mechanism compartment 18 and an air duct 20, said duct having in its bottom walls any suitable arrangement of louvres (not shown) communicating with the external atmosphere.

Within the washing and drying compartment 16 there may be positioned two dish-retaining wire trays 22 which may be of any conventional type such as those which slidably mount on rail mechanisms (not shown) for loading and unloading movement. The cabinet front includes a bottom hinged door 24 which opens outwardly to allow access to the compartment interior.

To supply water to the wash compartment, a supply conduit 30 communicates between the compartment and a conventional domestic source of hot water. The supply of inlet water from the conduit is controlled by any conventional solenoid operated valve shown representatively as rectangle 32. For draining water from the compartment, there is provided a drain opening 34 within the sump area 36, the low point of compartment 16. This opening 34 feeds a drain pump 37 which in turn exhausts vitiated liquid to the conventional domestic sewage line.

For circulating wash or rinse water through the compartment, an impeller 38 of any generally known design extends into the lower sump area 36 of the wash compartment. A particularly suitable impeller is that shown in Koertge U.S. Patent 2,422,022, granted June 10, 1947, for as noted in said patent, the impeller includes air circulation means as well as water circulation blades. This impeller is driven by a motor 40 which extends through horizontal wall 14. The wall is sealed about the motor so that no seepage enters compartment 18. The motor 40 is a reversible motor which has a double-ended shaft.

Figure 3:
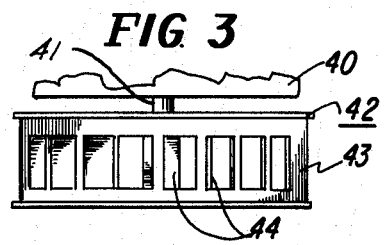
FIG. 3 is a side sectional elevation of an air blower wheel as used herein.
Figure 4:
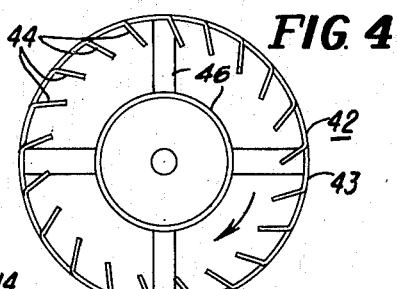
FIG. 4 is a bottom view of the blower wheel of FIG. 3.

To the upper shaft (not shown) is affixed the water impeller 38 and to the lower shaft extremity 41, FIG. 3, is secured an air blower wheel 42. The air blower comprises a hollow cylinder 43 with louvers or scoops 44 formed therein. The wheel is mounted for rotation with the motor shaft by means of a suitable conventional spider or support frame 46 such as that shown in FIG. 4. Air is drawn axially into the blower wheel through air duct louvers (not shown) beneath it. On one direction of rotation a high volume air flow is impelled through air duct 20. On rotation of the motor in the opposite direction, the blower is quite inefficient, and only a very low volume of air is moved by the blower wheel 42.

The air duct 20 is in communication with the wash compartment past baffle plate 50 which serves to deflect all air incoming to the compartment downwardly along the compartment wall toward the horizontal wall 14. The duct is insulated along its outer surface 54 by a suitable heat insulation layer 52. Within the duct, there is affixed in spaced relation to the duct inward wall surface 55 (the underside of the horizontal wall 14) a heating element 56 which may be an open coil electrical resistance heater. Optimally, the heat coil may be rated at approximately 400 to 600 watts. This heater is spaced from wall surface 55 a distance considerably less than the spacing between the coil and the insulated wall 54. Spaced a short distance from the coil and parallel to it is a heat accumulator 57, which may be of heat absorbent material such as steel wool or steel mesh screen. The accumulator extends approximately along the duct center in the path of passing air flow. The accumulator receives and stores heat for transfer to air flowing thereover. Within compartment 16, there are affixed to the upper surface of wall 14 opposite duct 20, a plurality of fins 58 which serve to transmit excess heat from the duct wall to the water which is adjacent the wall during a wash or rinse period. Said fins are in mutually parallel spaced relation so as not to interfere with water flow along wall 14. One of the fins may mount a thermostat 59 which opens its contacts at a predetermined high level such as 200° F., and re-closes when a predetermined lower temperature is reached.

Finally in describing the general construction, it may be noted that there is an upper exhaust vent 60 leading from compartment 16 to the exterior room above the upper extent of the door. Above the vent, there may be mounted an external control knob 61 which governs the operation of the machine control timing apparatus 62 and the like, which will now be described more fully.

Figure 2:
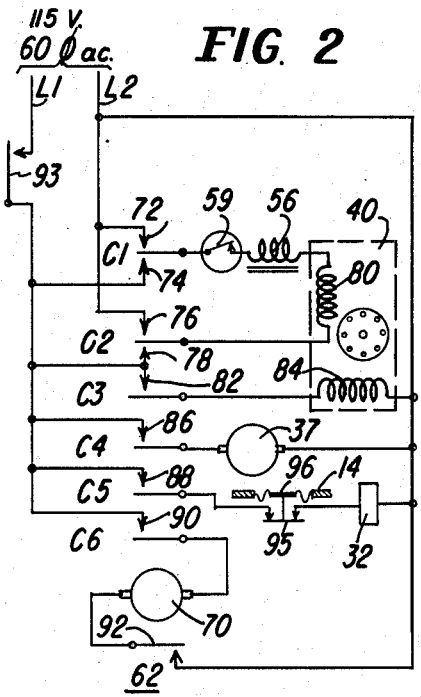
FIG. 2 is a schematic diagram of a control circuit for operating the invention.

Now referring to the circuit of FIG. 2, there is shown the timing apparatus 62 which comprises a timer motor 70 which in a generally known manner rotates a cam bank (not shown) to control the operation of a plurality of cam actuated contactors C1–C6. Contactor C1 on operation may be actuated to an upper contact 72, a lower contact 74 or may be open intermediate therebetween. The next contactor C2 may be closed to an upper contact 76, a lower contact 78 or may be open to both. These contactors C1 and C2 combine to reverse the direction of energization of the auxiliary winding 80 of motor 40 and thus reverse the motor drive direction. Contactor C3 has only one stationary contact 82, which may be closed for energizing the run winding 84 of motor 40. A contactor C4 may be closed to its single stationary contact 86 for completing a path to drain pump 37. The next contactor C5 is operable to a closure to stationary contact 88 for completing a path to water fill solenoid valve 32. The final contactor C6 is closed to its stationary contact 90 for the entire operative cycle, thus maintaining the timer motor energized for the entire cycle. A manually actuatable line switch 92 may be connected in the circuit to the timer motor. Such a line switch may be closed in the usual manner by depression of the manual control knob 61. The switch 92 is released by the timer reaching the conclusion of the cycle, also in a conventionally known manner.

For supplying power to the circuit of FIG. 2, there are provided the two power conductors L1 and L2 which are connected to a conventional source of 115 volt, 60 cycle alternating current. In the circuit of conductor L1, there is connected a series switch 93 which may be a door switch opened by opening of the door and which switch must be closed for the operation of the cycle. In addition, the circuit may include the contacts of thermostat 59 connected in series with both the motor auxiliary winding 80 and resistor 56. The thermostat protects the tub wall against overheating by opening the circuit to the motor auxiliary winding circuit. The run winding will, of course, continue to energize the motor as long as its operating circuit remains closed. A final, normally closed switch 95 is shown in series with the water inlet solenoid valve 32 to serve as a high water level control or shut-off for inlet water. Such a switch conventionally includes a diaphragm 96 responsive to weight of water in the tub to open the schematically shown contacts to end water fill in the circumstance that the desired water level was reached before the timer opened contacts C5, 88.

Now turning to the operation of the dishwasher, the trays 22 are loaded with soiled dishes, the door 24 is closed and latched, and the knob 61 is depressed and rotated to start the operative sequence. The particular sequence employed may include one or more pre-rinse cycles, one or more wash cycles, followed by one or more final rinse cycles. Each cycle includes a water fill period, a water circulation period, and a drain period. The cycles differing only in period length and the presence or absence of dispensing of various additives. At the start of the entire sequence, the timer motor circuit is completed from lead L1, through switch 93, closed contacts 90—C6, timer motor 70 and switch 92 to lead L2. This circuit remains closed for the entire operative sequence maintaining the timer energized continually. For the start of each cycle, contactor C5 is closed to contact 88 to complete an obvious circuit to valve 32 to start inlet water into the machine. To momentarily flush out all remnants, pump 37 may be energized through a short duration period of closure of contactor C4 to contact 86. The pump is then shut off and valve 32 continues to fill the compartment with inlet water. Feed water continues until such time as the inlet water is shut off by the opening of water level contacts 95.

To circulate water for the ensuing washing operation, contactor C1 closes to contact 72, C2 closes to 78 and C3 closes to 82. The motor auxiliary winding 80 is energized over a path from lead L1 and switch 93 through contacts 78—C2, winding 80, heating resistance 56, closed thermostat contacts 59, contacts C1—72 and lead L2. The main winding is energized over a path from lead L1 and switch 93 and contacts 82—C2, winding 84 to lead L2. Because of the different reactances in the two winding circuits, the two motor windings are energized mutually out of phase and the motor starts its rotation. As the motor rotates, water is impelled by the impeller 38 through the compartment to wash the dishes in a known manner. During this period of motor rotation, the motor is also rotating the air blower in a direction generating a low volume of air through duct 20.

During this period of motor operation, the auxiliary winding 80 remains energized along with resistance heater 56. Resistance heater 56 heats up the passing low volume air but most of the generated heat is transferred to the accumulator 57 and the surrounding duct walls. A substantial portion of this generated heat may be transmitted to the water adjacent wall 14 through upwardly extended fins such as 58. This heat transmission to the water tends to keep the duct walls and accumulator 57 from overheating. If the duct becomes overheated during this low air flow period, the heat will traverse wall 14 and fins 58. With the thermostat 59 secured to a fin 58, the thermostat will react to a high temperature condition at the fin to open its internal circuit. As mentioned previously, the thermostat may be set at 200° F. to prevent steaming of the water in the compartment during a wash or rinse period. It is an unlikely possibility that the thermostat will open during a wash or rinse period due to the comparatively short duration of each motor operating period; however if this reaction were to occur the auxiliary winding 80 and the heater 56 would both be deenergized. With the auxiliary winding out of the circuit, the motor run winding continues to drive the motor to circulate water. With the heater deenergized, the thermostat will cool to its reoperate level, at which time the circuit will be reclosed to the auxiliary winding and heater. Such reclosure has no effect on the continuing operation of the motor.

At the conclusion of the timed period allocated for each of the wash or rinse water circulations (which may each range from 1 to 6 minutes normally and may total 15 minutes of motor operation), the motor energizing contactors C1, C2 and C3 restore and the motor decelerates. Thereafter contactor C4 closes to complete an obvious path to pump 37 to discharge vitiated water from the sump 36 to the sewage drain system.

After a predetermined number of these cycles of varying duration for pre-rinse, wash and rinse, the sequence continues on into the drying cycle. For the drying cycle, the motor is energized in the reverse direction. To effect this result, C1 closes to 74, C2 closes to 76 and C3 closes to 82. The auxiliary winding energization direction is thereby reversed with respect to the direction of the energization of the run winding and the motor accelerates in the reverse direction. With this direction of motor rotation, the blower 42 rotates in the direction indicated by the arrow in FIG. 4 and circulates a high volume air flow to the duct 20. This air passes the preheated duct walls and the heat accumulator, absorbs heat therefrom, and passes into the compartment where it is dispersed by the action of the diametrically opposite blades 38.1 of impeller 38. The heated air at high volume (which may be in the range of 15 to 20 cubic feet per minute) is circulated through the compartment and is exhausted out the baffled exhaust vent 60. During this drying period which may last 20 minutes, heater 56 is continuously energized to provide additional heat for raising the temperature of the air used to dry the dishes in the compartment. At the end of the drying period, the timer motor 70 releases and opens all circuits and the appliance returns to its at rest condition.

In an impeller 38 of the above-noted Koertge type, the blades 38.1 accomplish satisfactory air movement independent of the direction of rotation of the impeller. However, many conventional dishwasher impellers are not equipped with air blades, and upon reverse rotation would not provide satisfactory air circulation. While it is quite possible to accomplish the objective of lessened air flow during a washing or rinsing cycle by means of timer operated clutching devices interposed between the motor and the blower wheel 42—pursuant to which the blower would be inactive during a washing cycle and operative only during the drying cycle—air movement through the duct 20 may be controlled by the presence or absence of a water seal at the discharge end of the air passage.

Figure 5:
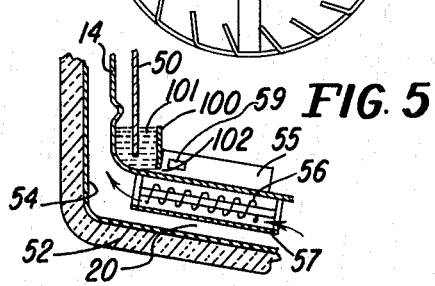
FIG. 5 is a fragmentary sectional view of a second embodiment.

Looking now at FIG. 5, I have provided a wall 100 which cooperates with the baffle 50 and the upward extension of the wall 14 to provide a trap 101 which accumulates water during a washing or rinsing operation, it being understood that during such operations, water will be flowing downwardly along the wall 50. The depth of the trap should be capable of maintaining about one inch of water above the bottom of wall 50.

At the base of wall 100, I provide any necessary number of drain holes 102. The drain capacity of these holes will total less than the quantity of water flowing into the trap, whereupon during a washing or a rinsing operation, the trap will remain flooded. The discharge pressure of the blower 42 will be of the order of one-half inch of water, and thus the blower will be unable to establish air movement through the duct 20 and into the compartment 16 so long as the trap contains one inch of water. During the drainage period preceding the air drying operation, the trap empties itself through the openings 102, to free the outlet for the passage of drying air into the compartment. Pursuant to this embodiment of the invention, therefore, selective air flow into the compartment is provided without the necessity of a reversible motor 40.

It should be noted that where there is a drying period of 20 minutes, the combined periods of motor operation during wash and rinse may total about 15 minutes or 75% of the drying time. This percentage may vary from 50% to 80% of the drying time with various cycles. In any event, it can be seen that the period of heat storage by the duct and heat absorbent medium totals a significant percentage of the heating period. Thus during the storing period, a considerable amount of heat may be accumulated for use during the drying cycle.

While there has been described what is at present thought to be a preferred embodiment of the invention, it will be understood that modifications may be made therein and it is intended to cover in the appended claims all such modifications which fall within the true spirit and scope of the invention.

What is claimed is:

1. A dishwasher including a compartment for containing dishes to be washed and dried,
   means for supplying liquid to said compartment,
   means for draining the liquid therefrom,
   an air duct communicating between said compartment and the ambient atmosphere for admitting air to said compartment for drying the dishes,
   heat storage means in said duct,
   a drive motor,
   means operated by said motor for circulating liquid throughout said compartment for washing the dishes therein,
   first and second electric circuits for energizing said motor, said first circuit including an electrical resistance element within said duct in heat exchange relation with said heat storage means, said first and second circuits being normally concurrently energized during the operation of said motor,
   switch means in said circuits for energizing said motor for a first operational period to accomplish a washing operation,
   means for operating said liquid drainage means subsequent to said washing operation,
   means for reactivating said circuits for operating said motor for a second period to accomplish a dish-drying operation,
   air translation means operated by said motor under all conditions of operation thereof to effect air movement within said air duct,
   means for minimizing said air movement during the first-named period of operation of said motor to permit accumulation of heat by said heat storage means,
   and means for maximizing air flow over said heat storage means and into said compartment during the second-named operational period of said motor, whereby to increase the heat content of air entering said compartment to accelerate the drying of dishes therein.

2. A dishwasher including a washing compartment for accommodating dishes to be washed therein, said compartment having water inlet and water drainage means,
   an air passage communicating between said compartment and ambient atmosphere to provide for air flow through said compartment, means in said compartment to effect water circulation therein for a dishwashing operation, a reversible drive motor for operating said water circulation means, a blower directly connected to said motor for operation thereby in either direction of rotation thereof, said blower being arranged to effect translation of air through said passage, said blower having means whereby to provide minimum air movement through said passage and into said compartment during rotation of said blower in a first direction and maximum air movement thereinto during rotation of said blower in the opposite direction, an electric circuit for continuously energizing said motor for rotation selectively in said first or said opposite directions, said circuit including an electric resistance heater in said air passage in heat exchange relation with the air moving therethrough, control means in said circuit for energizing said motor for a period of operation in said first direction to wash the dishes in said compartment, means communicating with said water drainage means to remove water from said compartment following said washing operation, and control means for energizing said motor for a period of operation in said opposite direction subsequent to said water removal whereby the resulting air movement through said air passage and into said compartment abstracts heat from said resistance element to accelerate the drying of the dishes therein.

3. A dishwasher including a compartment for containing dishes to be washed and dried, means for supplying liquid to said compartment, means for draining the liquid therefrom, an air duct communicating between said compartment and the ambient atmosphere for admitting air to said compartment for drying the dishes, a drive motor, means operated by said motor for circulating liquid throughout said compartment for washing the dishes therein, first and second electric circuits for energizing said motor, said first circuit including an electrical resistance element within said duct in heat exchange relation with air passing therethrough, means for concurrently activating said first and second circuits for a period of operation of said motor to accomplish a washing action, thermostat means in said first-named circuit to interrupt only said first-named circuit in the circumstance of a predetermined high temperature condition within said compartment, means for operating said liquid drainage means subsequent to said dish washing operation, means for subsequently reactivating said circuits for a period of operation of said motor to accomplish a dish drying operation, air translation means operated by said motor to effect air movement through said duct and into said compartment, means for minimizing said air movement during the first-named period of operation of said motor, and means for maximizing air flow through said duct during the second-named period of operation of said motor, whereby to abstract heat from said electrical resistance element to increase the heat content of air entering said compartment to accelerate the drying of dishes therein.

4. A dishwasher including a compartment for containing dishes to be washed and dried, means for supplying liquid to said compartment, means for draining the liquid therefrom, an air duct communicating between said compartment and the ambient atmosphere for admitting air to said compartment for drying the dishes, heat storage means in heat transfer relation with air traversing said air duct, a drive motor, means operated by said motor for circulating liquid throughout said compartment for washing the dishes therein, first and second electric circuits for energizing said motor, said first circuit including an electrical resistance element within said duct in heat exchange relation with said heat storage means and the air passing thereover, means for concurrently energizing said first and second circuits for a period of operation of said motor to accomplish a washing action, thermostat means in said first-named circuit and in heat transfer relation with a wall of said compartment to interrupt said first-named circuit in the circumstance of a predetermined high temperature condition of said wall, means for operating said liquid drainage means subsequent to said dish washing operation, means for subsequently reactivating said circuits and associated electrical resistance element for a period of operation of said motor to accomplish a dish drying operation, and air translation means operated by said motor to effect air movement over said heat storage means and into said compartment.

References Cited in the file of this patent

UNITED STATES PATENTS

| 1,323,216 | Cornwall et al. | Nov. 25, 1919 |
| 1,627,949 | Baker | May 10, 1927 |
| 1,971,979 | Hitchcock | Aug. 28, 1934 |
| 2,081,636 | Minors | May 25, 1937 |
| 3,023,757 | Mixon | Mar. 6, 1962 |
| 3,028,869 | Jordan | Apr. 10, 1962 |
| 3,029,825 | Cushing | Apr. 17, 1962 |
| 3,064,664 | Warhus | Nov. 20, 1962 |

FOREIGN PATENTS

| 597,487 | Great Britain | Jan. 27, 1948 |